United States Patent [19]
Makram-Ebeid

[11] Patent Number: 6,047,090
[45] Date of Patent: Apr. 4, 2000

[54] METHOD AND DEVICE FOR AUTOMATIC SEGMENTATION OF A DIGITAL IMAGE USING A PLURALITY OF MORPHOLOGICAL OPENING OPERATION

[75] Inventor: Shérif Makram-Ebeid, Dampierre, France

[73] Assignee: U.S. Philips Corporation, New York, N.Y.

[21] Appl. No.: 08/895,253

[22] Filed: Jul. 16, 1997

[30] Foreign Application Priority Data

Jul. 31, 1996 [FR] France ................................. 96 09641

[51] Int. Cl.$^7$ ............................. G06T 5/20; G06T 5/30; G06K 9/44; G06K 9/46
[52] U.S. Cl. ......................... 382/257; 382/173; 382/199; 382/205; 382/128; 382/130; 382/132
[58] Field of Search .................................... 382/256, 257, 382/258, 259, 260, 266, 269, 274, 128, 130, 132, 173, 199, 205

[56] References Cited

U.S. PATENT DOCUMENTS 5,768,405  6/1998  Makram-Ebeid ........................ 382/130
5,832,134  11/1998  Avinash .................................. 382/257
5,872,861  2/1999  Makram-Ebeid ........................ 382/130

OTHER PUBLICATIONS

"Automatic Detection of Brain Contours in MRI Data Sets" (Abstract) by Brummer et al in the IEEE Transaction on Medical Imaging, vol. 12, No. 2, Jun. 1993, pp. 153–156.
"Segmentation of 3D MR image sequences" (Abstract) by Harris et al in Computers in Cardiology, Sep. 1996, pp. 425–428.
"Morphological registration of 3D medical images" (Abstract) by Thiran et al in the International Conference on Image Processing Proceedings, vol. 2, Sep. 1996, pp. 253–256.
"Real–Time Algorithm for Image Segmentation Based on the Morphological Reconstruction" (Abstract) by Morgenstern in The 16th Conf. of Electrical and Electronics Engineers in Israel, Mar. 1989, pp. 1–3.
"Segmentation of multiple scerosis lesions in intensity correction multispectral MRI" (Abstract) by Johnston et al in the IEEE Transactions on Medical Imaging, vol. 15, No. 2, Apr. 1996, pp. 154–169.
"Semi–automatic morphological meausrements of 2–D and 3–D microvascular images" (Abstract) by Merchant et al in the IEEE Int'l Conf. on Image Processing Proceedings, vol. 1, Nov. 1994, pp. 416–420.
"Digital Image Processing" by Gregory A. Baxes, John Wiley & Sons 1994, pp. 139–146.
"An Introduction to Morphological Image Processing" by Dougherty, SPIE Tutorial Texts Series, 1992, pp. 91–103.

(List continued on next page.)

Primary Examiner—Scott Rogers
Attorney, Agent, or Firm—Dwight H. Renfrew

[57] ABSTRACT

A method of processing a digital image representing ribbon-shaped objects of non-uniform intensity contrasting with a background of lower intensity includes an automatic segmentation phase having one or more morphological opening operations effected, respectively, with one or more three-dimensional structuring elements. The latter have a two-dimensional base parallel to the image plane and have a non-binary intensity function in a third dimension. Preferably, the automatic segmentation phase is carried out by means of a set of two-dimensional spatial structuring elements with a third intensity dimension. The set contains N anisotropic structuring elements oriented from $\pi/N$ to $\pi/N$ and one isotropic structuring element.

17 Claims, 9 Drawing Sheets

OTHER PUBLICATIONS

"A Fully Automated Idnetification of Coronary Borders from the Tree Structure of Coronary Angiograms" by Chien– Chuan Io, Chi–Wu Mao, Yung–Nien Sun, and Shei–Hsi Chang, in the International Journal of Bio–Medical Computing, 39 (1995), pp. 193–208, Published by Elsevier.

"Semi–Automatic Segmentation of Vascular Network Images Using a Rotating Structuring Element (Rose) with Mathematical Morphology and Dual Feature Thresholding", Brett D. Thackray and Alan C. Nelson, pp. 385–392, IEEE Transactions on Medical Imaging vol. 12, Sep. 1993, No. 3, New York, U.S.A.

METHOD AND DEVICE FOR AUTOMATIC SEGMENTATION OF A DIGITAL IMAGE USING A PLURALITY OF MORPHOLOGICAL OPENING OPERATION

BACKGROUND OF THE INVENTION

1. Field of the Invention

The invention relates to a method of processing a digital image representing ribbon-shaped objects of non-uniform intensity contrasting with a background of smaller intensity, which method includes an automatic segmentation phase, and also relates to a device for a medical system, which device carries out this method. The invention is applied, in particular, in the medical imaging systems industry, such as in arterial X-ray imaging systems, and more particularly, to cerebrovascular imaging systems.

2. Description of Related Art

An image processing system for the segmentation of a coronary arteriogram and for automatically determining the arterial skeleton and borders in this arteriogram is known from the publication entitled "A fully automated identification of coronary borders from the tree structure of coronary angiograms" by Chien-Chuan KO, Chi-Wu MAO, Yung-Nien SUN, and Shei-Hsi CHANG, in the International Journal of Bio-Medical Computing, 39 (1995), pp. 193–208, published by ELSEVIER.

This method comprises the acquisition of a digital angiographic image and the segmentation of this image for separating information relating to objects formed by the arteries from the rest or background of the image. The segmentation step comprises a sequence of morphological operations. This sequence includes first of all the application of a median filter to the original image to remove noise while preserving the object borders. The smoothed image is subsequently processed by morphological filters.

For processing the image the arteries are shown as bright representations on a dark background. A morphological filter is first applied to said smoothed image to identify background portions having slow intensity variations. This filter effects a morphological closing operation using a flat hexagonal morphological structuring element having a diameter of 25 pixels. A flat morphological structuring element means that the intensity data inside the filter limits is constant. The diameter of 25 pixels is greater than the diameter of the arteries in the original image. By means of this operation arteries narrower than the hexagon are removed from the smoothed image. The resulting image is then subtracted from the smoothed image to produce a new image which still retains the object edge information. This morphological closing operation forms a background extraction operation. For this purpose, it includes a dilation operation followed by an erosion operation.

This background extraction operation by morphological closing is followed by a linear intensity normalization to enhance the contrast and subsequently by a thresholding operation to produce a binary image.

The actual segmentation of the image into objects and background is now performed on this binary image. It includes a binary closing operation to smooth the contours of the coronary artery and to restore vessel sections broken during the background extraction process. It further comprises a binary opening operation applied to the preceding image, in order to remove extraneous objects from the arterial system. In these two morphological closing and opening operations the structuring elements are flat. The operations are based on contours.

In all the morphological operations performed, the algorithms are iterative and require much computing time.

It is at this stage where the image segmentation in accordance with the method known from the document cited ends.

The known method relates more particularly to a contrast-rich original image where the arteries can be distinguished clearly or where there is a comparatively small amount of overlap of arteries, the arterial system rather having a tree shape, and where anomalies such as stenoses are to be detected.

SUMMARY OF THE INVENTION

It is on object of the present invention to provide a automatic segmentation system for a digital image, particularly representing an arterial system of a part of the brain.

Processing such an image presents new and serious problems. Indeed, an arteriogram of the brain has a smaller contrast than an angiogram; the arterial network of the brain is not tree-shaped but is very dense with numerous crossings of vessels owing to superpositions; within the same zone the vessels exhibit very different diameters with highly varying contrasts owing to the fact that the medicament injected into the patient to make the vessels more opaque during the exposure spreads less satisfactorily in this dense arterial system.

These problems are solved by a method of processing a digital image representing ribbon-shaped objects of non-uniform intensity contrasting with a background of substantially lower intensity, which method includes an automatic segmentation phase comprising one or a plurality of morphological opening operations effected with a three-dimensional structuring element having a two-dimensional base parallel to the image plane and having a non-binary intensity function in a third dimension.

An advantage is that this method segments the image into vessel sections which each have a given orientation. The orientation data thus determined is independent of the data relating to other close or secant sections since these other sections have different orientations. This method is therefore particularly suitable for the segmentation of cerebral arteriograms.

Another advantage of this method is that it requires a particularly small computing time, which means that with the present state of the art this method can readily be made approximately 70 times as fast as the known method.

Thus, a device for a medical system, for the processing of digital medical images, which carries into effect this method provides very good results with a very short computing time.

The invention will be described hereinafter with reference to the accompanying diagrammatic drawing.

DETAILED DESCRIPTION OF THE PREFERRED EMBODIMENTS

The Figures will be described in detail hereinafter in relation to the various steps of a method of filtering a digital image, comprising the representation of objects in the form of highly contrasting ribbons on a background, in which steps an automatic image segmentation is effected to label the pixels as pixels belonging to the background and pixels belonging to the objects, for ultimately constructing a binary image in which the objects have a level 1 and the background has a level 0.

Figure 1A:
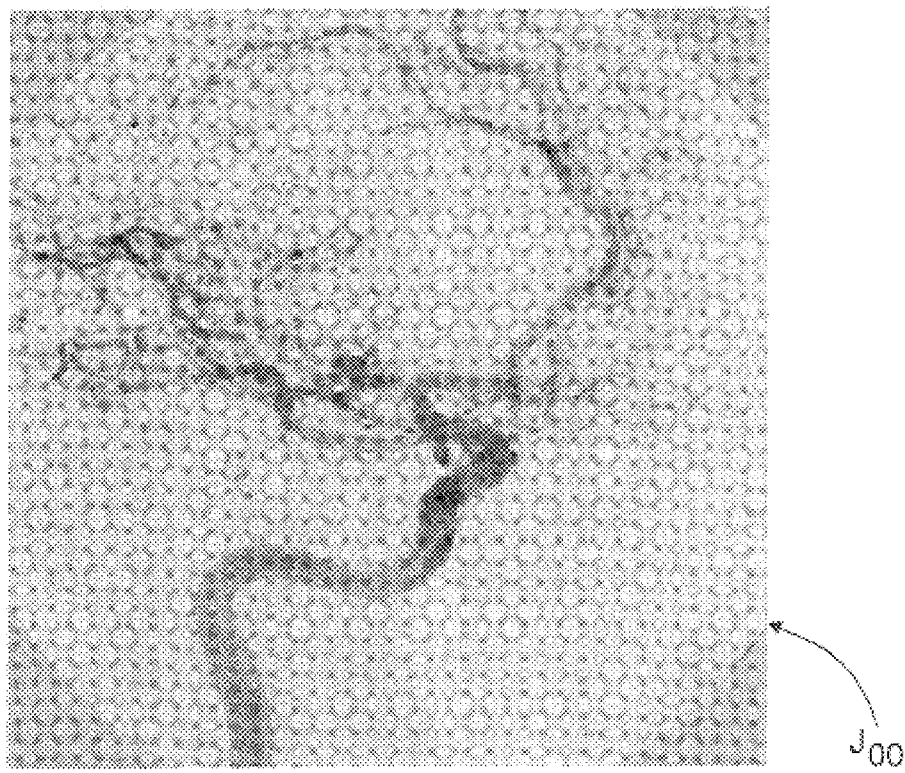
FIGS. 1A and 1B are intensity images, i.e. one original image and the corresponding segmented image, respectively.

As is illustrated in FIG. 1A, for the use envisaged by way of example, the original digital intensity image is an arteriogram of the brain. In this arteriogram the vessels form a tangle of elongate dark ribbons which are difficult to examine, both for diagnosis and for therapy. The image has a low contrast. The vessels are hard to discern and have numerous overlaps.

Figure 1B:
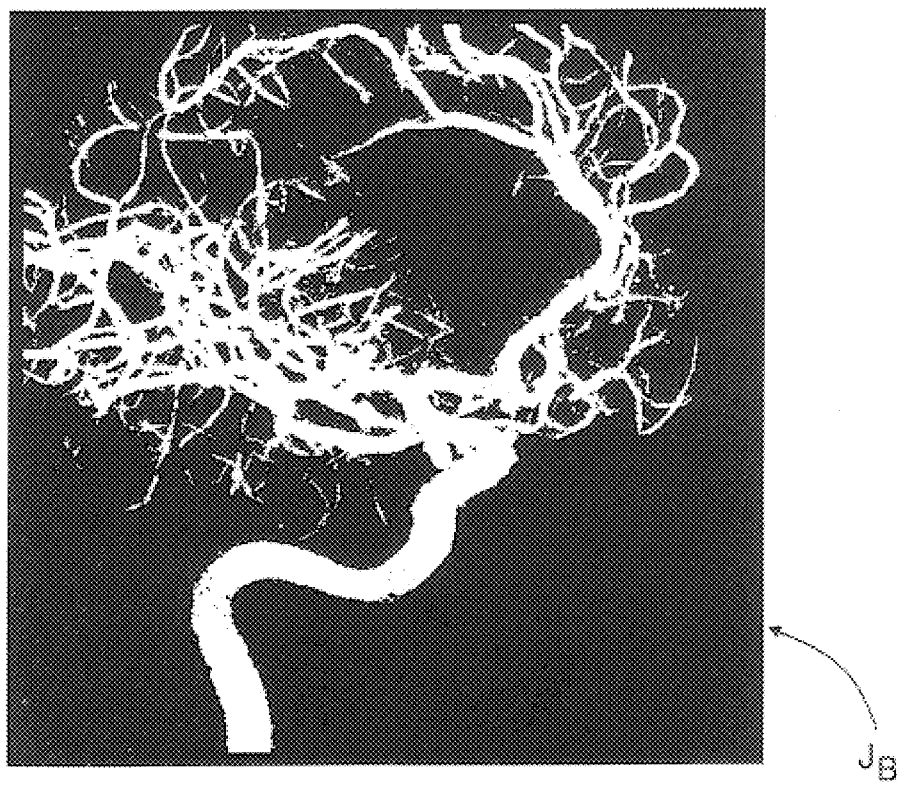

As is illustrated in FIG. 1B, after completion of the segmentation process, the image has become a binary image and exclusively shows the arterial system of the arteriogram of FIG. 1A shown with a constant intensity level, contrasting on a uniform background.

The present method makes it possible to derive the image of FIG. 1B from the image of FIG. 1A without loss of information. Thus, the accuracy of the medical diagnosis or the therapy of the physician working with the image of FIG. 1B is improved considerably in comparison with what would have been possible when working with the original image.

Figure 9:
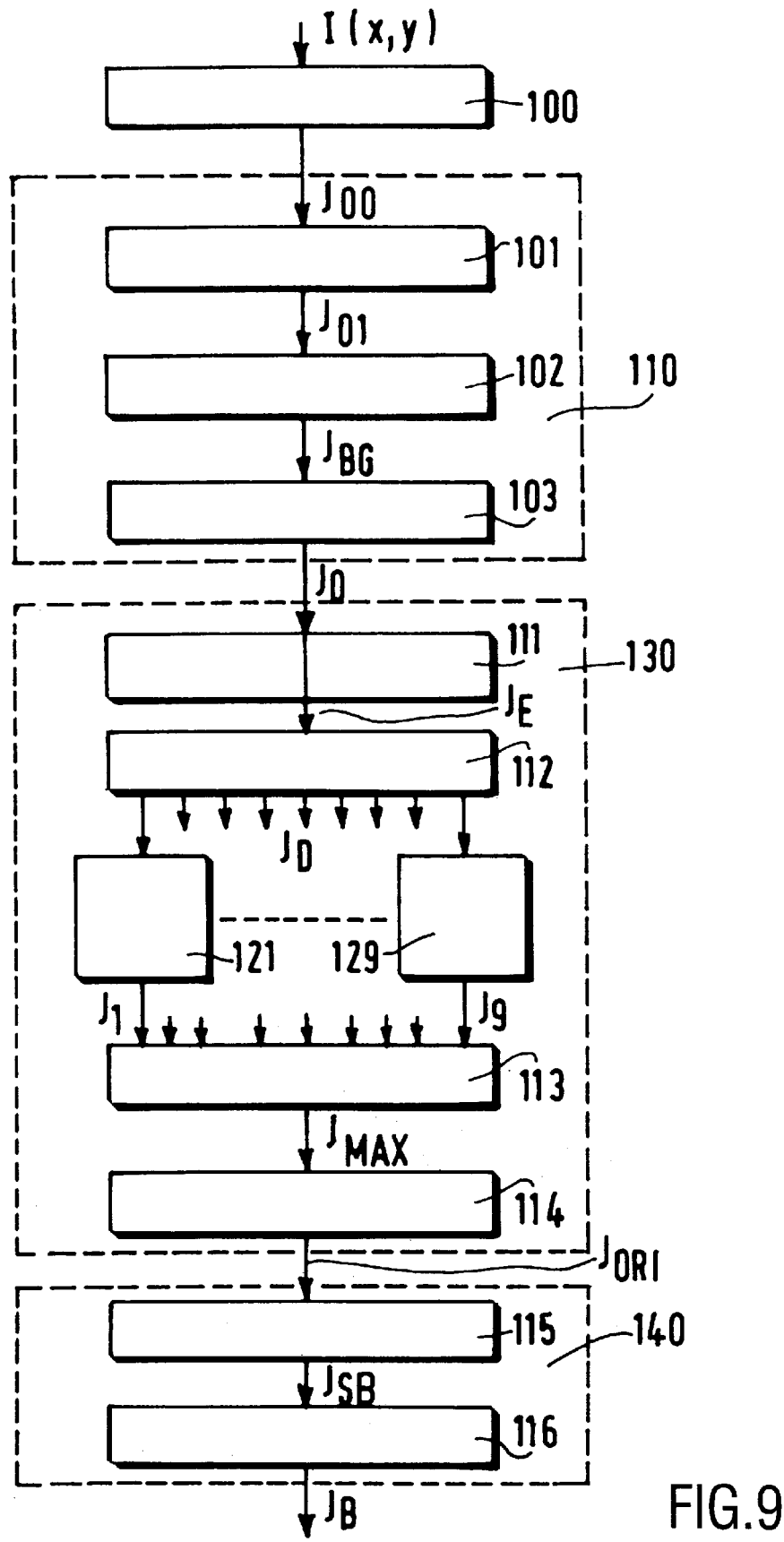
FIG. 9 illustrates the segmentation method by means of functional blocks.

As illustrated in FIG. 9, which illustrates the method by means of functional blocks, the segmentation method preferably comprises the sequence of steps described below:

1. Acquisition of a Digital Image

As shown in step 100 of FIG. 9 the digital image (such as illustrated in FIG. 1A) is acquired by digital image-forming means 200, (FIG. 10) in the form of a bidimensional matrix $J_{00}$ of pixels having digitized intensity levels. The acquired image $J_{00}$ represents a cerebral arteriogram in which the arteries form dark ribbons on a brighter background. This image is first subjected to a filtering operation 101 in order to eliminate noise, for example by means of low-pass smoothing.

Subsequently, the intensities are inverted by any known method in order to provide a digital image $J_{01}$ in which the objects to be detected are bright on a dark background. This yields an image which is of the same type as the image processed by means of the method known from the state of the art.

In the subsequent part of the method use is made of these images in which the vessels are bright ribbons on a darker background.

2. Background Extraction

For a coarse removal of any elements extraneous to the arterial system a background extraction 110 is performed upon the smoothed image $J_{01}$.

Figure 2A:
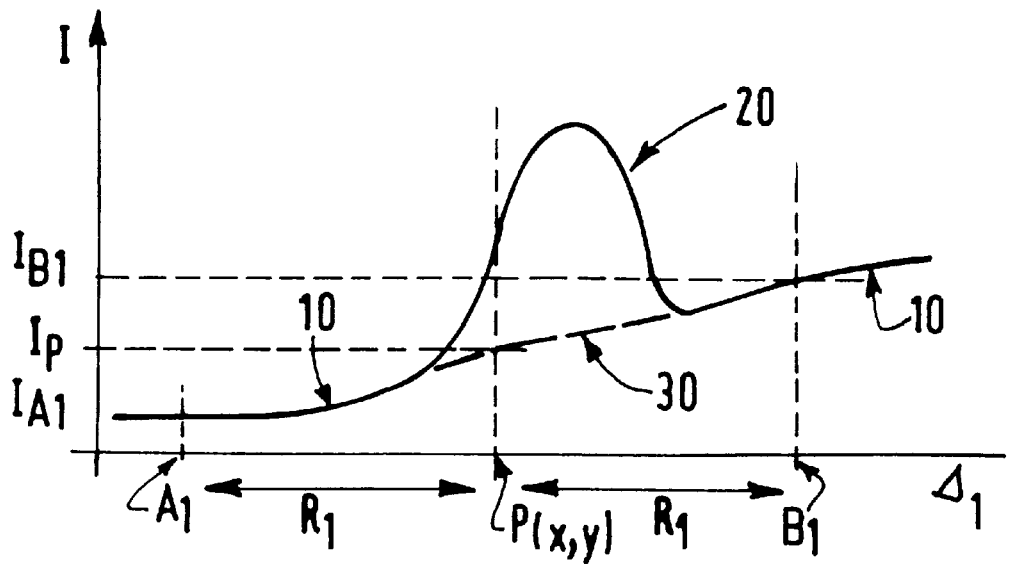
FIGS. 2A to 2C respectively show the steps of background extraction to different scales and in accordance with different orientations.

FIG. 2A shows an intensity profile along a pixel line $\Delta 1$ which intersects a vessel 20 in an image $J_{01}$. This intensity profile has a part 10 with slow intensity variations corresponding to the background and a part 20 forming an intensity hump corresponding to the vessel.

As illustrated in FIG. 2A, the background extraction comprises a passage of a filter 102 centered on a current pixel $P(x,y)$ of the line $\Delta 1$, which forms an average between an intensity $I_{A1}$ of a point A1 situated at a given distance R1 to the left of the current pixel $P(x,y)$ and an intensity $I_{B1}$ of a point B1 situated at the same distance R1 to the right of the current pixel $P(x,y)$ on the line $\Delta 1$. The calculated average intensity $I_P$ is assigned to the current pixel $P(x,y)$.

As a result of the passage through this filter 102 the intensity hump 20 caused by the vessel is eliminated, a background part 30 is estimated at its location.

Figure 2B:
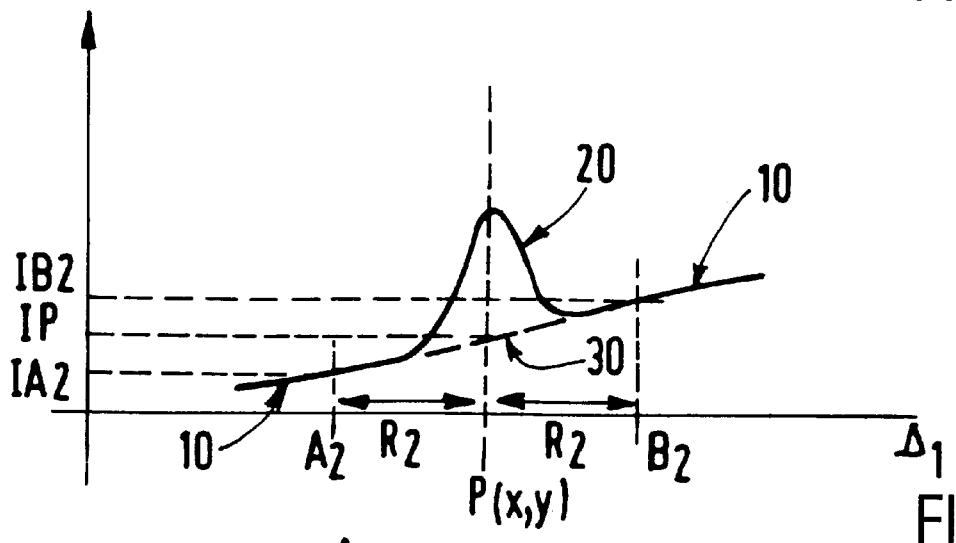

This filter operation 102 is performed to a first scale with a first distance R1 in such a manner that the value 2R1 is greater than the transverse dimensions of the largest vessels. As illustrated in FIG. 2B, this filter operation can, moreover, be performed to a second scale with a different value of the distance R2, which is chosen as a function of the diameters of the smallest vessels.

Figure 2C:
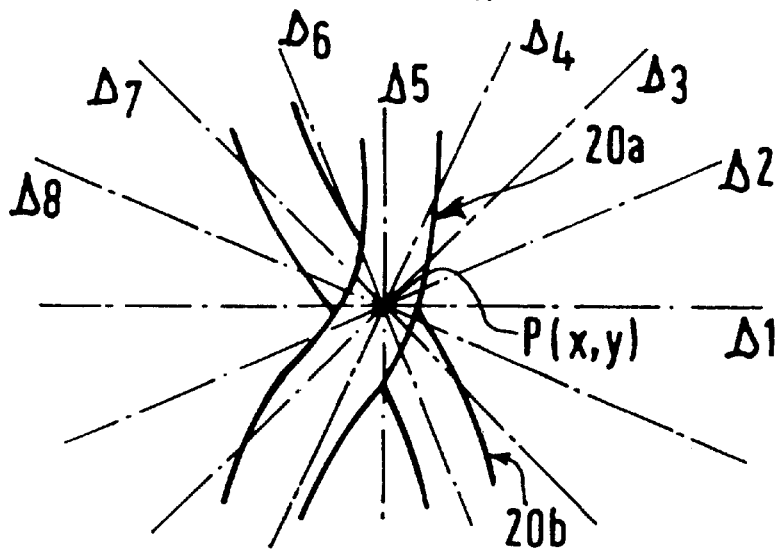

As illustrated in FIG. 2C, which is a diagrammatic plan view of the vessels $20a$ and $20b$ in the smoothed image $J_1$, this filter operation 102 is carried out not only to one or several scales, as in FIGS. 2A and 2B, but also in accordance with a plurality M of directions $\Delta 1$ to $\Delta M$ which are regularly spaced in the image plane $J_{01}$ by $\pi/M$ to $\pi/M$. Preferably, M=8. Consequently, this filter operation 102 is effected in 8 directions which are angularly equi-spaced by $\pi/8$ to $\pi/8$.

In each current point $P(x,y)$ the intensity value of the background is subsequently estimated as the smallest value of all the estimated values by varying the scale and the orientation $\Delta$. This operation 102 yields an estimated background image $J_{BG}$.

Subsequently, an image $J_0$ is formed by assigning the calculated intensity data to the pixels by subtracting, by means of an operation 103, the estimated intensity values for the background and derived from the image $J_{BG}$, from the intensity data of the smoothed image $J_{01}$.

This background extraction method is very precise because the intensity value of the background is also estimated and subtracked at the locations of the vessels.

This background extraction method is very advantageous because it does not require a large amount of computing time and because it does not produce any faults, errors or inaccuracies in the areas of overlapping or superposition of vessels.

The image $J_0$ is now the working image; the image $J_0$ shows bright vessels against a dark background.

3. Segmentation Phase Called Fuzzy Segmentation

A first segmentation phase 130, called fuzzy segmentation is performed on the image $J_0$, resulting in background extraction. The name "fuzzy segmentation" is adapted to distinguish this segmentation from other segmentation methods know from the prior art.

To carry out this segmentation phase it is borne in mind that the image $J_0$ to be processed is not a binary image but that the ribbon-shaped vessels have variable intensities, contrasting with the lower-intensity background, which has been made substantially uniform.

Figure 3:
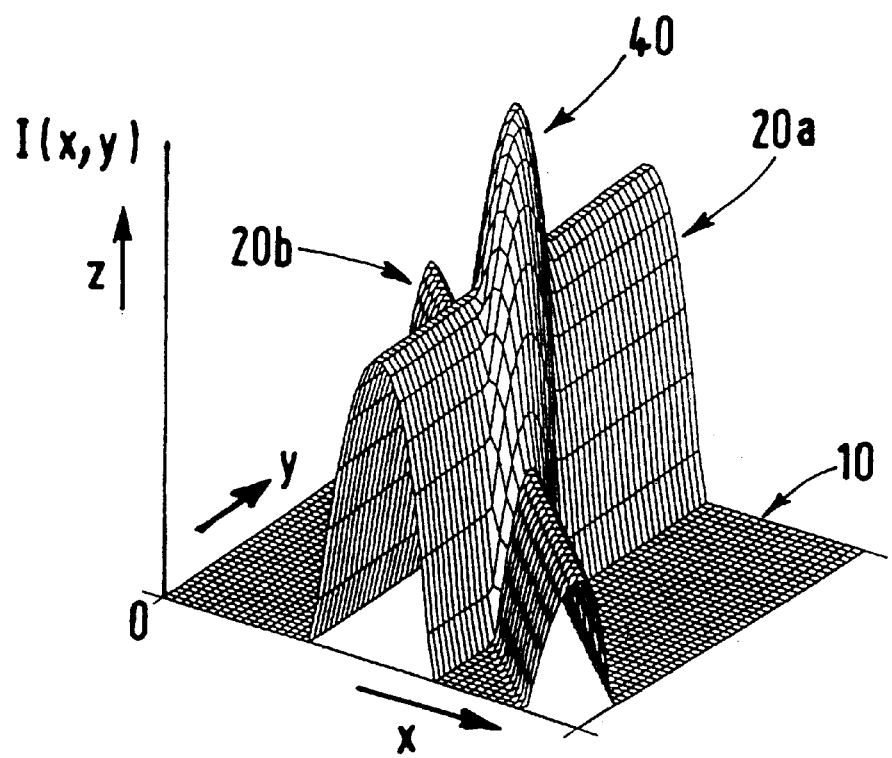
FIG. 3 is a perspective view representing a part of an intensity image in relief, with two spatial dimensions and one intensity dimension.

In accordance with this method, as illustrated in FIG. 3, the image $J_0$ to be segmented is regarded as a fictitious three-dimensional landscape, i.e. with two spatial dimensions (x, y) corresponding to the axes of the two-dimensional pixel matrix and a third dimension z along which intensity values I(x,y) are plotted which vary as a function of the two spatial dimensions. In this fictitious landscape arteries, for examples those referenced 20a, 20b, form tunnels of varying height depending on their intensity value with respect to the background, i.e. objects having elongate shapes and rounded upper parts, standing out from the substantially flat background. In FIG. 3 two arteries cross one another, i.e. in reality they are superposed. In the intensity image $J_0$ the intensity at the crossing is equal to the sum of the intensities of the two arteries. This is represented by the intensity hump 40 in FIG. 3.

This fuzzy segmentation phase 130 comprises a morphological opening operation carried out with one or a plurality of three-dimensional structuring elements. Three-dimensional is to be understood to mean that the structuring element has a spatially two-dimensional base in a plane u,v parallel to the image plane x,y, and has a non-binary intensity function G, i.e. exhibits an intensity function G(u,v) which is variable in a third dimension z, as a function of the two spatial dimensions.

Figure 4B:
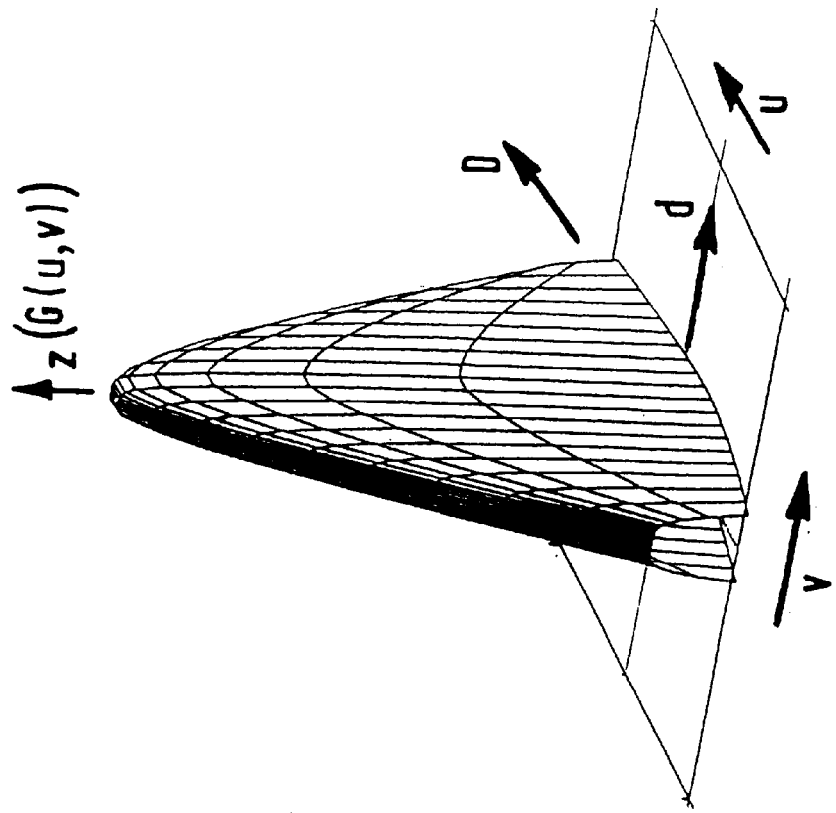
FIGS. 4A and 4B are perspective views showing respectively an isotropic structuring element and an oriented anisotropic structuring element.
Figure 4A:
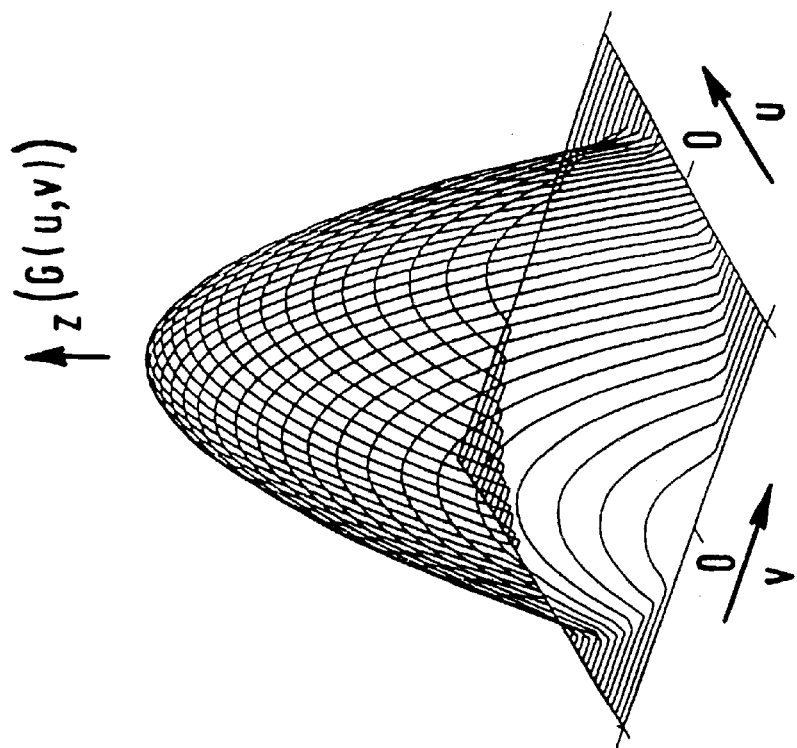

As illustrated in FIG. 4A, the base of the structuring element can, for example, be circular. The element is then isotropic. The intensity function G(u,v) is generated by rotation about an axis of symmetry z passing through the center of the circle and serving as a coordinate axis for the intensities.

As illustrated in FIG. 4B, the base can be oblong having a minor principal axis of orientation d and a major principal axis of orientation D. The structuring element is consequently anisotropic. Preferably, the morphological opening operation is effected by means of a plurality of structuring elements.

Figure 5A:
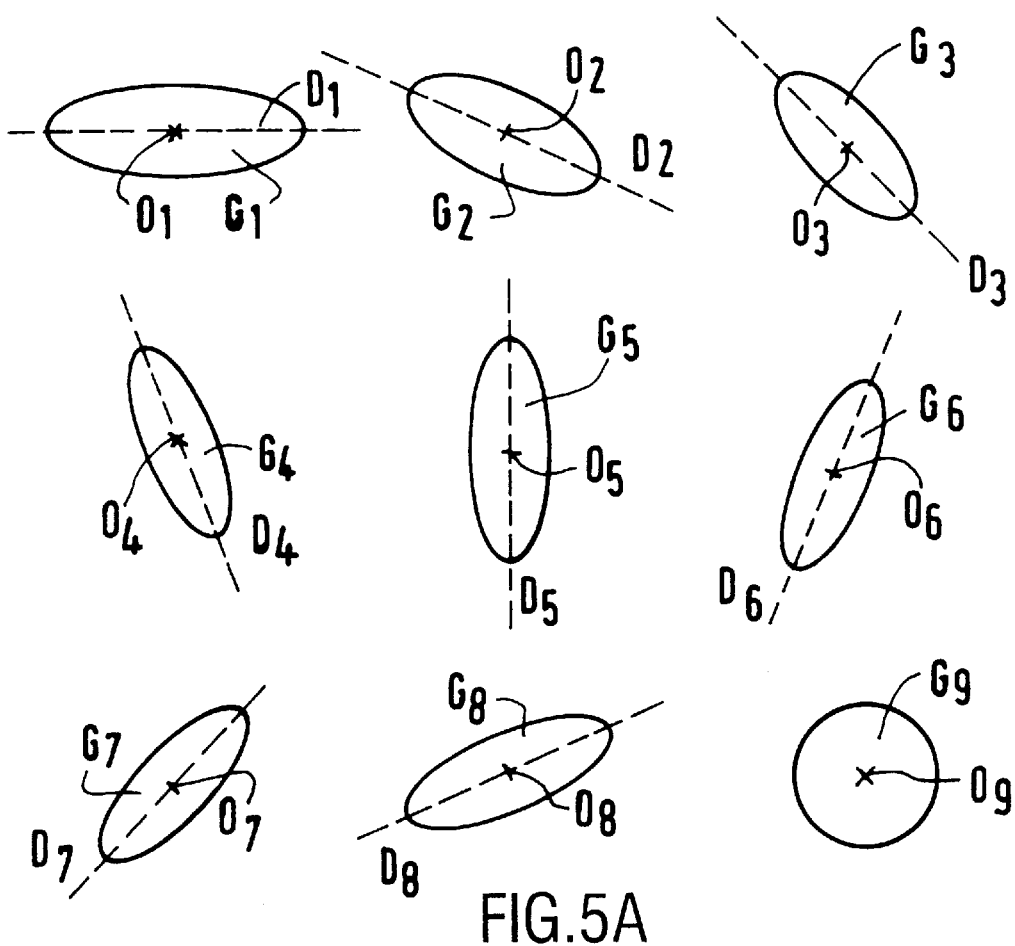
FIG. 5A is a plan view, in a plane parallel to the image plane, showing the bases of the oriented isotropic and anisotropic structuring elements.

As illustrated in FIG. 5A, a set of structuring elements is formed, comprising a plurality of N anisotropic structuring elements having major principal axes of orientation D1 to DN which are angularly equi-spaced in the plane (u,v) parallel to the image plane x,y by $\pi$/N to $\pi$/N. In FIG. 5A the bases of 8 structuring elements $G_1$ to $G_8$ are shown, whose major principal axes of the directions D1 to D8 have centers $O_1$ to $O_8$ and are angularly equi-spaced by $\pi$/8 to $\pi$/8.

As illustrated in FIG. 5A, this set of structuring elements includes an isotropic element $G_9$ whose base exhibits a center of symmetry $O_9$.

As illustrated in FIG. 3, which shows a part of a three-dimensional image $J_0$, and in FIGS. 4A, 4B, which show examples of three-dimensional structuring elements, the morphological opening operation is effected to determine which structuring element of the set of anisotropic oriented or isotropic structuring elements first best in a given vessel section, so as to determine the position, size, intensity and orientation of this vessel section.

For this purpose, a first set of structuring elements $G_1$ to $G_9$ is formed, as described hereinbefore with reference to FIG. 5A, to a first scale in order to detect the large diameter vessels having long sections in the same direction, and one or more other sets of structuring elements are formed to a smaller scale or scales in order to detect smaller vessels.

Figure 5B:
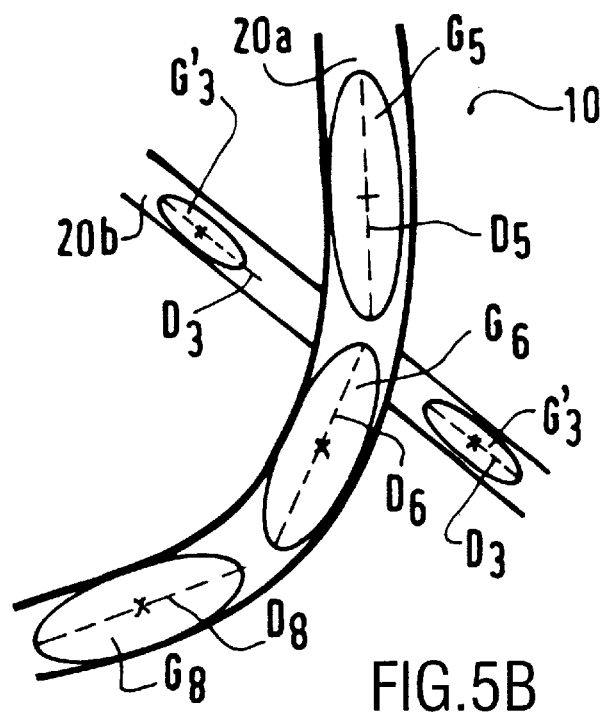
FIG. 5B shows the matching of the vessels with structuring elements which are best oriented with respect to the directions of said vessels and to the better scale.

As illustrated in FIG. 5B, for example, structuring elements of the type $G_8$, subsequently of the type $G_6$ and subsequently of the type $G_5$ fit into the vessel 20a, enabling the size, the direction and the intensity of the three sections of this vessel 20a to be determined. Moreover, structuring elements $G'_3$ of a smaller scale fit into the vessel section 20b, enabling the size, direction and intensity of this section to be determined.

The advantage of this method is that vessels which cross one another, such as 20a and 20b, can be segmented individually, i.e. without an error being made at the crossing.

Figure 7A:
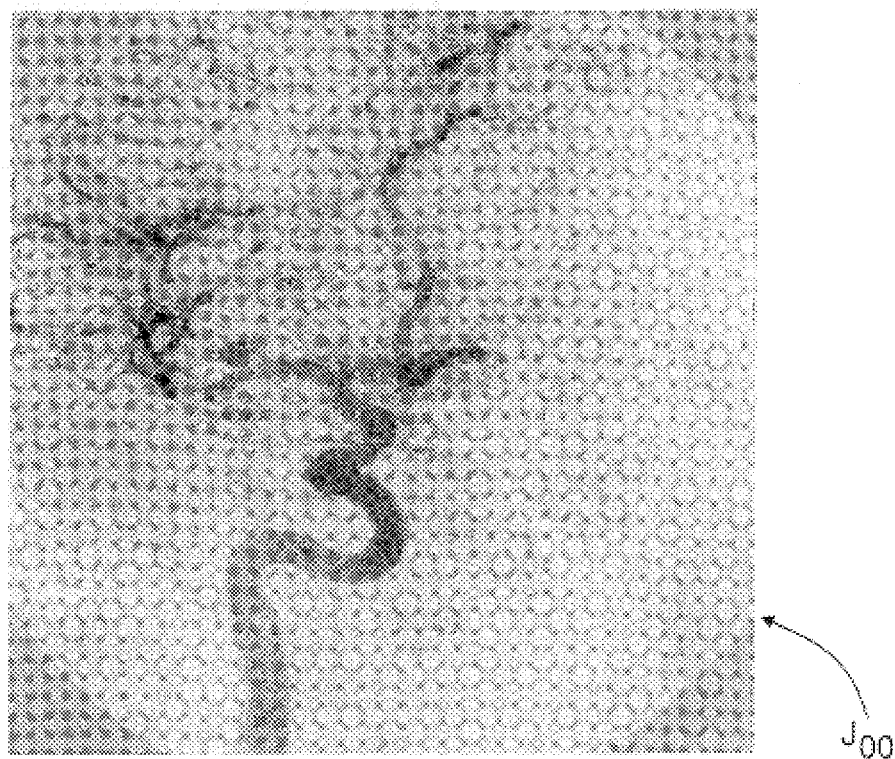
FIG. 7A represents an original intensity image showing a cerebral arteriogram.
Figure 7B:
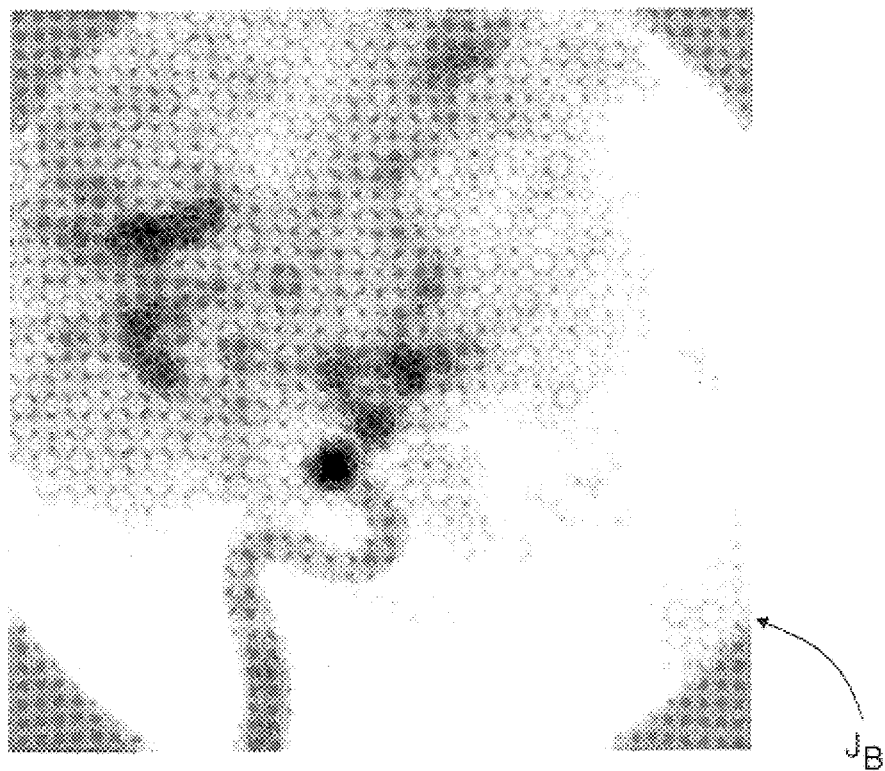
FIGS. 7B, 7C, 7D are morphological opening images with the aid of isotropic structuring elements, anisotropic structuring elements with an orientation $\pi/2$, and anisotropic structuring elements with an orientation $\pi/4$, respectively.

Thus, a first morphological opening operation can be effected by means of the isotropic structuring element of the type shown in FIG. 3A. This operation is effected by passing said isotropic structuring element over points of an image $J_0$ corresponding to an original image $J_{00}$, for example as shown in FIG. 7A, along rows and columns, in order to produce an opening image as shown, for example, in FIG. 7B, in which the circular objects, or rather the vessels having transverse dimensions such as the structuring element which can be inserted therein, are detected.

It is to be noted that the images of FIGS. 7A to 7D have inverted intensities with respect to the actual working image $J_0$. In this image processing method such an inversion is purely symbolical and has been applied here to obtain images which are better understandable.

Figure 7C:
Figure 7D:

Subsequently, a plurality of morphological opening operations can be performed by means of respective elements of the set of N anisotropic oriented structuring elements. These operations are effected by passing said anisotropic structuring elements over points of the image $J_0$, along the row of points parallel to the major principal axes, in order to produce a set of N opening images in which respective vessel sections having the same orientation as said principal axes are detected. Thus, an opening image formed by applying a structuring element of the orientation $\pi$/2 is shown in FIG. 7C and a structuring element of the orientation $\pi$/4 is shown in FIG. 7D.

In general, the intensity functions of the structuring elements are monomial functions of an order higher than 1 or quadratic functions such as, for example:

$$G(u)=a \cdot u^n$$

where u is the variable in accordance with an image processing axis, for example the major axis of an anisotropic structuring element, where a is a constant, and where n is a constant greater than 1. The scale of the structuring element can be determined by adjusting the values of these constants.

Figure 6A:
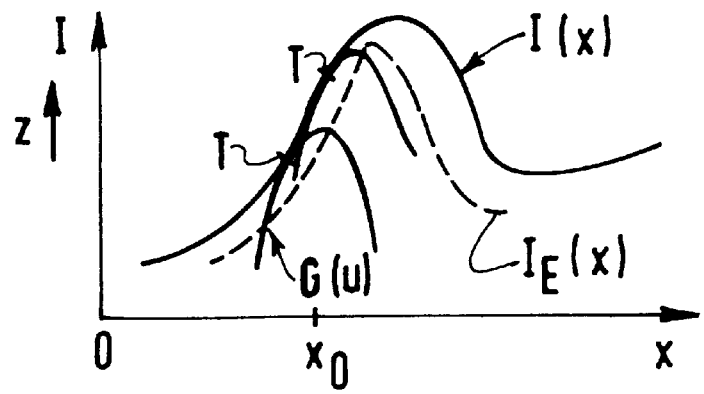
FIGS. 6A to 6C illustrate the morphological opening operations.

As illustrated in FIG. 9, the opening operation 130 first of all comprises a first erosion sub-operation 111. As illustrated in FIG. 6A, erosion is performed upon an intensity profile I(x) of the image $J_0$ in a plane defined by an axis of abscissae x parallel to a direction of a principal axis D, or occasionally d, or of the radius of a given structuring element G; this plane is also defined by an axis of ordinates z on which the intensity values are plotted. Erosion is effected by means of the intensity function G(u) of the structuring element which exhibits a maximum in this plane. Erosion is effected in each abscissa point $x_0$ of the intensity profile I(x) by successive shifts of the intensity function G(u) underneath the intensity profile (I(x) with a tangent point T; the determination of the geometrical locus of the maximum of the function G(u) during this shifting defines the eroded form $I_E(x)$ of the intensity profile I(x), as is shown in broken lines in FIG. 6A.

Figure 6B:
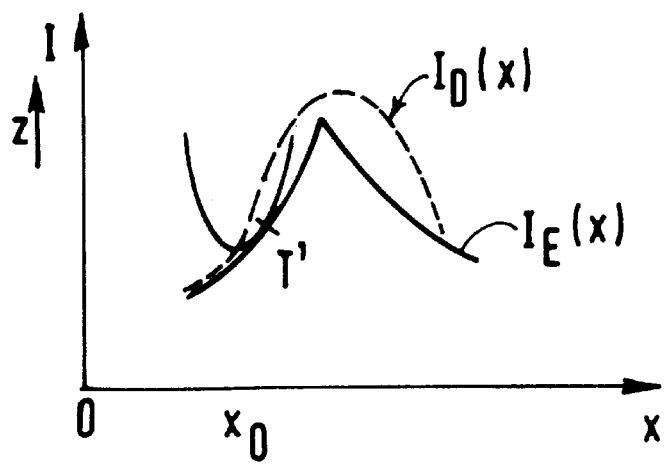

As illustrated in FIG. 9, the opening operation comprises a second dilation sub-operation 112 applied to the eroded profile $I_E(x)$ by means of the inverted intensity function $-G(u)$ of the structuring element having an intensity minimum in the plane x,z. Dilation is applied to each abscissa point $x_0$ of the eroded profile $I_E(x)$ by successive shifting of the inverted intensity function $-G(u)$ over said eroded profile with a tangent point T'. The determination of the geometrical locus of the minimum of the function $-G(u)$ during this shifting defines the dilated form $I_D(x)$ of the eroded intensity profile, as shown in broken lines in FIG. 6B.

Figure 6C:
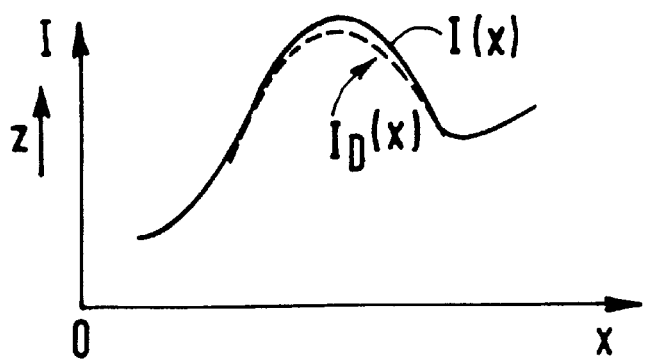

As illustrated in FIG. 6C, the erosion-dilation operation makes it possible to determine from the set of elements the structuring element which is best-fitting in the vessel sections.

The passage of the anisotropic elements parallel to the major principal axis makes it possible to determine the vessel sections having a significant length oriented along this major axis, while the passage of the isotropic element determines the transverse dimensions of the vessels.

The passage of the isotropic element also allows a very important detection of anomalies such as vascular aneurysms because these anomalies have a rounded shape forming a bulge on a vessel. Such anomalies can be detected only by the association of oriented anisotropic structuring elements and the isotropic element. These anomalies are inevitably detected with the proposed set or sets of structuring elements to one or a plurality of scales.

As illustrated in FIG. 9, N opening images are formed by means of N opening operations 130. Thus, in the case of nine structuring elements, for example, nine opening images 121 through 129 are formed.

As illustrated in FIG. 9, a new image is formed at 113 on the basis of the opening images. In this new image each pixel is given the maximum intensity of the intensities calculated by means of the N+1 structuring elements. This image is called the maximum-intensity image $J_{MAX}$.

Figure 8:
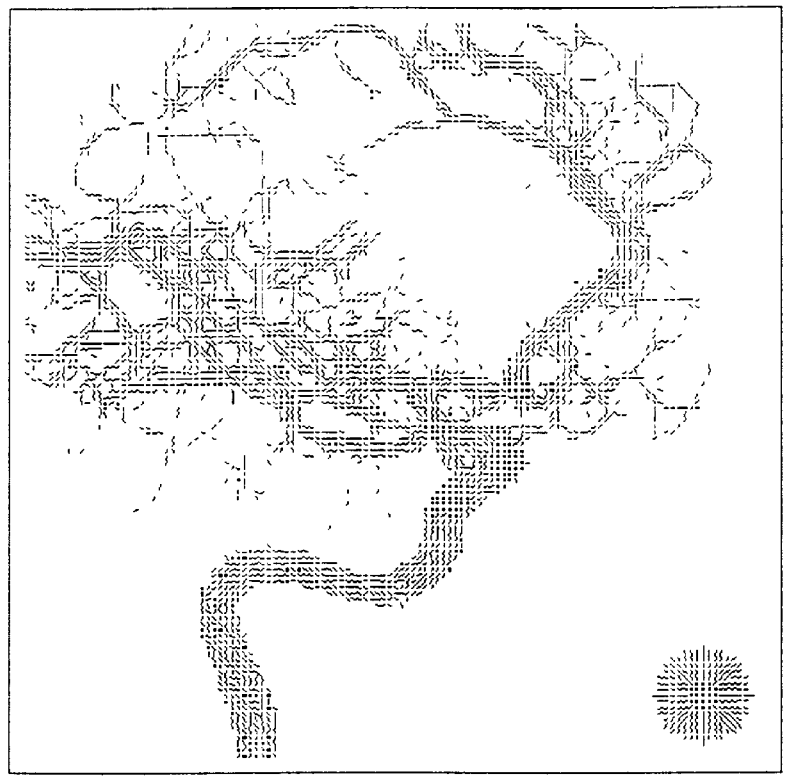
FIG. 8 shows an image called orientation image, obtained as a result of filtering by the oriented isotropic and anisotropic structuring elements, where the vessel sections are marked either by lines having specific orientations or by points.

By means of an operation 114 the information of the different opening images can also be regrouped in an image shown in FIG. 8, which is an image segmented into 9 orientation classes corresponding to the vessel sections detected by means of the 9 structuring elements of FIG. 5A, the highest intensity being given. The different segmented sections are shown with lines parallel to the major axes of the corresponding structuring elements, or with points in the case of parts detected by means of the isotropic structuring element.

4. Binary Segmentation Phase

Subsequently, for the first time in the method, a binary image $J_{SB}$ is formed by a thresholding operation 115. At the end of the thresholding operation, in accordance with a method known from the state of the art, the image is divided into connected domains. Two pixels are referred to as "connected" if the distance between these two pixels, expressed as a number of pixels, is smaller than a predetermined distance. Thus, domains of a minimal area are defined, which are referred to as connected domains containing connected pixels. In an operation 116 the pixels not belonging to connected domains thus defined are eliminated.

A segmented binary image $J_B$ such as that shown in FIG. 1B is then obtained.

It is to be noted that the segmentation method applies a morphological opening operation to an image in which the objects are bright against a dark background, using erosion-dilation sub-operations.

It is possible and equivalent to apply such a segmentation method to an image in which the objects are dark against a bright background, using a morphological closing operation with dilation-erosion sub-operations and employing the set of structuring elements described hereinbefore. The background subtraction operation can also be effected as described above, taking into consideration that the intensities have been inverted.

Figure 10:
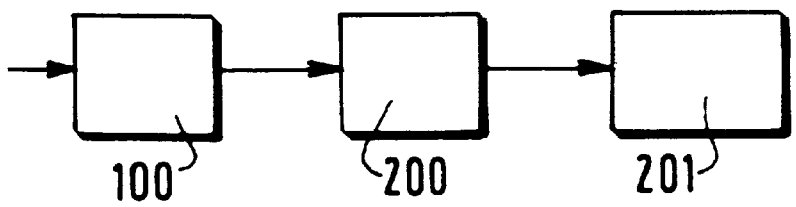
FIG. 10 shows a device for carrying out the method.

As illustrated in FIG. 10, a medical image processing device, which can be used in conjunction with a means of forming an arteriogram of the brain, or which can be used in conjunction with various radiological means, comprises:

a system 201 for the acquisition of a digitized medical image, particularly an arteriogram, an image processing system 202 having access to digital image data, including a microprocessor for carrying out the segmentation method described hereinbefore, and a display system 203, coupled to an output of the microprocessor, for displaying the various images involved in the method.

All references cited herein are incorporated herein by reference in their entirety and for all purposes to the same extent as if each individual publication or patent or patent application was specifically and individually indicated to be incorporated by reference in its entirety for all purposes.

I claim:

1. A method of processing a digital image representing ribbon-shaped objects of non-uniform intensity contrasting with a background of lower intensity, which method includes an automatic segmentation phase comprising:

a plurality of morphological opening operations effected, respectively, by means of a plurality of elements of a set of N three-dimensional structuring elements having anisotropic two-dimensional bases parallel to an image plane with respective principal axes which are angularly equi-spaced in the image plane by $\pi/N$ and having respective non-binary intensity functions in a third dimension, with an optimum (maximum or minimum) in the center of the principal axis of the base, wherein each said morphological opening operation is effected by passing said anisotropic structuring elements over points of the digital image along lines of points parallel to said principal axes, to produce a set of N opening images in which respective ribbon-shaped object sections are detected which have the same orientation as said principal axes, and constructing a segmented image including said detected object sections from the N opening images and the background.

2. A method as claimed in claim 1, in which the intensity functions of the plurality of structuring elements are monomial functions of an order higher than 1, or quadratic functions, such as:

$$G(u)=a \cdot u^n$$

where u is the variable in accordance with a processing axis parallel to the plane of the image, a is a constant, n is a constant greater than 1 and is the exponent of the variable.

3. A method as claimed in claim 2, in which the plurality of morphological opening operations are effected at a plurality of different scales for the detection of objects of different diameters in the image.

4. A method as claimed in claim 2, in which each of the plurality of morphological opening operations comprises:

a first erosion sub-operation performed upon an intensity profile I(x) of the digital image in a plane defined by an axis of abscissae (x) parallel to a direction of a principal axis (D) of a structuring element or a given radius (G) of a structuring element, and by an axis of ordinates (z) on which the intensity values are plotted, and by means of the intensity function (G(u)) of the structuring element which exhibits a maximum in this plane, said first erosion sub-operation being effected in each abscissa point ($x_0$) of the intensity profile by successive shifts of the intensity function (G(u)) underneath said intensity profile I(x) with a tangent point (T) and by the determination of the geometrical locus of the maximum of said intensity function (G(u)) as the eroded form $I_E(x)$ of the intensity profile (I(x)), and a second dilation sub-operation applied to said eroded intensity profile $I_E(x)$ by means of the inverted intensity function (−G(u)) of the structuring element having a minimum in the said plane, said second dilation sub-operation being applied to each abscissa point ($x_0$) of the eroded intensity profile ($I_E(x)$) by successive shifting of the inverted intensity function (−G(u)) over said eroded intensity profile ($I_E(x)$) with a tangent point (T'), and by the determination of the geometrical locus of the minimum of said intensity function (−G(u)) as the dilated form ($I_D(x)$) of the eroded intensity profile.

5. A method as claimed in claim 1, in which the plurality of morphological opening operations are effected at a plurality of different scales for the detection of objects of different diameters in the image.

6. A method as claimed in claim 1, in which each of the plurality of morphological opening operations comprises:

a first erosion sub-operation performed upon an intensity profile I(x) of the digital image in a plane defined by an axis of abscissae (x) parallel to a direction of a principal axis (D) of a structuring element or a given radius (G) of a structuring element, and by an axis of ordinates (z) on which the intensity function of the structuring element which exhibits a maximum in this plane, said first erosion sub-operation being effected in each abscissa point ($x_0$) of the intensity profile by successive shifts of the intensity function (G(u)) underneath said intensity profile I(x) with a tangent point (T) and by the determination of the geometrical locus of the maximum of said intensity function (G(u)) as the eroded form $I_E(x)$ of the intensity profile, and a second dilation sub-operation applied to said eroded intensity profile $I_E(x)$ by means of the inverted intensity function (−G(u)) of the structuring element having a minimum in the said plane, said second dilation sub-operation being applied to each abscissa point ($x_0$) of the eroded intensity profile ($I_E(x)$) by successive shifting of the inverted intensity function (−G(u)) over said eroded intensity profile ($I_E(x)$) with a tangent point (T'), and by the determination of the geometrical locus of the minimum of said intensity function (−G(u)) as the dilated form ($I_D(x)$) of the eroded intensity profile.

7. A method as claimed in claim 1, in which a maximum intensity image is constructed by assigning to each pixel the maximum value of all the values determined for this pixel by means of the plurality of morphological opening operations, and in which said maximum intensity image is thresholded to produce a binary image.

8. A method as claimed in claim 1, further comprising, prior to the segmentation step, the additional steps of:

acquiring a digital image ($J_0$), which represents ribbon-shaped objects of non-uniform intensity contrasting with a background, in which image the objects are low-intensity objects against a background of higher intensity, performing an intensity inversion sub-operation, performing a noise smoothing sub-operation, yielding a smoothed image $J_{01}$, and performing a background extraction operation applied to the smoothed image which comprises performing a first sub-operation of passing over the pixels of the smoothed image a set of M filters which are angularly equi-spaced by $\pi/M$, where each filter determines an average intensity of points situated at opposite side of the current pixel at a distance ($R_1$, $R_2$) which is greater than the radii of the ribbon-shaped objects in said smoothed image, and which assigns said average to the current pixel, a second sub-operation for the formation of a background image in which the lowest intensity value of the intensities determined by the filters of the set is assigned to each pixel, and a third sub-operation for the subtraction of the background in the smoothed image to produce a working image ($J_0$) for the automatic segmentation phase.

9. The method of claim 1, wherein the segmentation phase further comprises a morphological opening operation effected by means of a structuring element having an isotropic two-dimensional base with a center of symmetry, and having a non-binary intensity function with an optimum (maximum or minimum) in the center of symmetry, which morphological opening operation is effected by passing said isotropic structuring element over points of the digital image along rows and columns, to produce an opening image in which substantially circular objects are detected, and wherein the constructing of the segmented image further comprises including the detected circular objects.

10. The method of claim 1 wherein N equals 8.

11. A method of processing a digital image representing ribbon-shaped objects of non-uniform intensity contrasting with a background of higher intensity, which method includes and automatic segmentation phase comprising a plurality of morphological opening operations effected, respectively, by means of a plurality of elements of a set of N three-dimensional structuring elements having anisotropic two-dimensional bases parallel to a image plane with respective principal axes which are angularly equi-spaced in the image plane by $\pi/N$, and having respective non-binary intensity functions in a third dimension, with an optimum (maximum or minimum) in the center of the principal axis of the base, wherein each said morphological opening operation is effected by passing said anisotropic structuring elements over points of the digital image along lines of points parallel to said principal axes, to produce a set of N opening images in which respective ribbon-shaped object sections are detected which have the same orientation as said principal axes, and constructing a segmented image including said detected object sections from the N opening images and the background.

12. A method of processing a digital image representing ribbon-shaped objects of non-uniform intensity contrasting with a background of lower intensity, which method includes an automatic segmentation phase comprising:

a morphological opening operation effected by means of a structuring element having an isotropic two-dimensional base parallel to a image plane with a center of symmetry, and having a non-binary intensity function with an optimum (maximum or minimum) in the center of symmetry, which morphological opening operation is effected by passing said isotropic structuring element over points of the digital image along rows and columns, to produce an opening image in which substantially circular objects are detected, and constructing a segmented image including the detected circular objects in the opening image and the background.

13. A method as claimed in claim 12, in which the intensity functions of the plurality of structuring elements are monomial functions of an order higher than 1, or quadratic functions, such as:

$$G(u)=a \cdot u^n$$

where u is the variable in accordance with a processing axis parallel to the plane of the image, a is a constant, n is a constant greater than 1 and is the exponent of the variable.

14. A method as claimed in claim 12, in which the plurality of morphological opening operation are effected at a plurality of different scales for the detection of objects of different diameters in the image.

15. A method as claimed in claim 12, in which each of the plurality of morphological opening operations comprises:

a first erosion sub-operation performed upon an intensity profile I(x) of the digital image in a plane defined by an axis of abscissae (x) parallel to a direction of a principal axis (D) of a structuring element or a given radius (G) of a structuring element, and by an axis of ordinates (z) on which the intensity values are plotted, and by means of the intensity function (G(u)) of the structuring element which exhibits a maximum in this plane, said first erosion sub-operation being effected in each abscissa point ($x_0$) of the intensity profile by successive shifts of the intensity function (G(u)) underneath said intensity profile I(x) with a tangent point (T) and by the determination of the geometrical locus of the maximum of said intensity function (G(u)) as the eroded form $I_E(x)$ of the intensity profile (I(x)), and a second dilation sub-operation applied to said eroded intensity profile $I_E(x)$ by means of the inverted intensity function (−G(u)) of the structuring element having a minimum in the said plane, said second dilation sub-operation being applied to each abscissa point ($x_0$) of the eroded intensity profile ($I_E(x)$) by successive shifting of the inverted intensity function (−G(u)) over said eroded intensity profile ($I_E(x)$) with a tangent point (T'), and by the determination of the geometrical locus of the minimum of said intensity function (−G(u)) as the dilated form ($I_D(x)$) of the eroded intensity profile.

16. The method of claim 12, wherein the segmentation phase further comprises a plurality of morphological opening operations effected, respectively, by means of a plurality of elements of a set of N three-dimensional structuring elements having anisotropic two-dimensional bases with respective principal axes which are angularly equi-spaced in the image plane by π/N, and having respective non-binary intensity functions in a third dimension, with an optimum (maximum or minimum) in the center of the principal axis of the base, each said morphological opening operation being effected by passing said anisotropic structuring elements over points of the digital image along lines of points parallel to said principal axes, to produce a set of N opening images in which respective ribbon-shaped object sections are detected which have the same orientation as said principal axes, and wherein the step of constructing the segmented image further comprises including said detected object sections from the N opening images.

17. A device for processing digital images representing ribbon-shaped objects of non-uniform intensity contrasting with a background of lower intensity, the device comprising a system for the acquisition of a digital image represented by digital image data, an image processing system having access to the digital image data for providing processed images, and a display system for displaying the acquired images and the processed images, wherein the image processing system further comprises means for processing a digital image representing ribbon-shaped objects of non-uniform intensity contrasting with a background of lower intensity by carrying out an automatic segmentation phase in which a plurality of morphological opening operations are effected, respectively, by means of a plurality of elements of a set of N three-dimensional structuring elements having anisotropic two-dimensional bases parallel to an image plane with respective principal axes which are angularly equi-spaced in the image plane by π/N, and having respective non-binary intensity functions in a third dimension, with an optimum (maximum or minimum) in the center of the principal axis of the base, wherein each said morphological opening operation is effected by passing said anisotropic structuring elements over points of the digital image along lines of points parallel to said principal axes, to produce a set of N opening images in which respective ribbon-shaped object sections are detected which have the same orientation as said principal axes, and means for constructing a segmented image including said detected object sections from the N opening images and the background.

* * * * *